US011967032B2

(12) United States Patent
Chen

(10) Patent No.: US 11,967,032 B2
(45) Date of Patent: Apr. 23, 2024

(54) AUGMENTED REALITY CONTENT EXPERIENCE SHARING USING DIGITAL MULTIMEDIA FILES

(71) Applicant: Google LLC, Mountain View, CA (US)

(72) Inventor: Yen-Lin Chen, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/066,094

(22) Filed: Dec. 14, 2022

(65) Prior Publication Data

US 2023/0114704 A1 Apr. 13, 2023

Related U.S. Application Data

(63) Continuation of application No. 17/301,596, filed on Apr. 8, 2021, now Pat. No. 11,557,100.

(51) Int. Cl.
| | | |
|---|---|---|
| G06T 19/00 | (2011.01) | |
| G06F 16/483 | (2019.01) | |
| G06F 16/487 | (2019.01) | |
| G06T 17/20 | (2006.01) | |
| G06V 20/20 | (2022.01) | |
| G06V 40/16 | (2022.01) | |

(52) U.S. Cl.
CPC .......... *G06T 19/006* (2013.01); *G06F 16/483* (2019.01); *G06F 16/487* (2019.01); *G06T 17/20* (2013.01); *G06V 20/20* (2022.01); *G06V 40/171* (2022.01)

(58) Field of Classification Search
None
See application file for complete search history.

(56) References Cited

U.S. PATENT DOCUMENTS

| | | |
|---|---|---|
| 10,802,147 B2 | 10/2020 | Nerurkar et al. |
| 11,222,478 B1 | 1/2022 | Martin et al. |
| 2014/0178029 A1 | 6/2014 | Raheman et al. |
| 2016/0358383 A1 | 12/2016 | Gauglitz et al. |
| 2017/0336511 A1 | 11/2017 | Nerurkar et al. |
| 2018/0253900 A1 | 9/2018 | Finding et al. |
| 2019/0155465 A1 | 5/2019 | Maxwell |

(Continued)

OTHER PUBLICATIONS

International Search Report and Written Opinion for International Application No. PCT/US2022/071595, dated Jul. 15, 2022, 15 pages.

(Continued)

*Primary Examiner* — Nicholas R Wilson
(74) *Attorney, Agent, or Firm* — Brake Hughes Bellermann LLP

(57) ABSTRACT

A computer-implemented method includes capturing visual data of an environment using an image sensor of an electronic device and non-visual data of the environment using one or more non-image sensors of the electronic device. Feature descriptors of one or more objects in the environment are generated using the visual data of the environment and the non-visual data of the environment. A map of the environment is generated using the feature descriptors of the one or more objects. One or more virtual objects are anchored to at least one of the objects using the map. The visual data, the non-visual data, and the map are combined in a digital multimedia container file. The digital multimedia container file is stored on the electronic device or on another electronic device connected to the electronic device.

14 Claims, 8 Drawing Sheets

(56) References Cited

U.S. PATENT DOCUMENTS

| | | |
|---|---|---|
| 2019/0340836 A1 | 11/2019 | Lynen et al. |
| 2019/0354761 A1 | 11/2019 | Arshad et al. |
| 2020/0074738 A1 | 3/2020 | Hare et al. |
| 2020/0106965 A1 | 4/2020 | Malia et al. |
| 2020/0342669 A1 | 10/2020 | Nattinger et al. |
| 2020/0342670 A1 | 10/2020 | Nattinger et al. |

OTHER PUBLICATIONS

"ARCore and Arkit, What is under the hood: SLAM (Part 2)", RK's Rambling, retrieved on Apr. 8, 2021 from https://blog.rabimba.com/2018/10/arcore-and-arkit-SLAM.html, Oct. 30, 2018, 11 pages.

"ARCore and Arkit: What is under the hood : Anchors and World Mapping (Part 1)", RK's Rambling, retrieved on Apr. 8, 2021 from https://blog.rabimba.com/2018/10/arcore-and-arkit-what-is-under-hood.html, Oct. 29, 2018, 11 pages.

"ARCore Overview", Google Developers, retrieved on Apr. 8, 2021 from https://developers.google.com/ar/discover, Nov. 6, 2020, 2 pages.

"Cloud Anchors overview for Android", Google Developers, retrieved on Apr. 8, 2021 from https://developers.google.com/ar/develop/java/cloud-anchors/overview-android#:~:text=users%20can%20share.-,What%20is%20a%20Cloud%20Anchor%3F,in%20a%20shared%20physical%20space, Feb. 19, 2021, 5 pages.

"Creating a Multiuser AR Experience", Apple Developer Documentation, retrieved on Apr. 8, 2021 from https://developer.apple.com/documentation/arkit/creating_a_multiuser_ar_experience, 6 pages.

"Fundamental Concepts", Google Developers, ARCore, retrieved on Apr. 8, 2021 from https://developers.google.com/ar/discover/concepts, Jan. 8, 2021, 4 pages.

Batt, "Understanding Anchors in Augmented Reality Experiences", Learning Solutions; https://earningsolutionsmag.com/articles/understanding-anchors-in-augmented-reality-experiences;, Jan. 27, 2020, 12 pages.

Chen, et al., "Remote Creation and Editing of Augmented Reality Content Using Cloud Anchors", Technical Disclosure Commons, https://www.tdcommons.org/dpubs_series/3882, Dec. 2020, 6 pages.

Fathi, "Creating Composite AR and Video Experiences with ARVideoKit and Agora", retrieved on Jan. 14, 2021 from https://www.agora.io/en/blog/creating-composite-ar-and-video-experiences-witharvideokit-and-agora/, Sep. 17, 2020, 10 pages.

Google, "Share AR Experiences with Cloud Anchors", retrieved on Aug. 31, 2020 from https://developers.google.com/ar/develop/java/cloud-anchors/overview-android, Feb. 28, 2019, 3 pages.

Jakl, "Basics of AR: SLAM—Simultaneous Localization and Mapping", retrieved on Apr. 8, 2021 from https://www.andreasjakl.com/basics-of-ar-slam-simultaneous-localization-and-mapping/, Aug. 14, 2018, 11 pages.

Lee, "Design of an Augmented Reality-Enabled Multimedia File Format With Embedded Object Tracking Metadata", International Journal of Multimedia and Ubiquitous Engineering, vol. 8, No. 4, Jul. 2013, 10 pages.

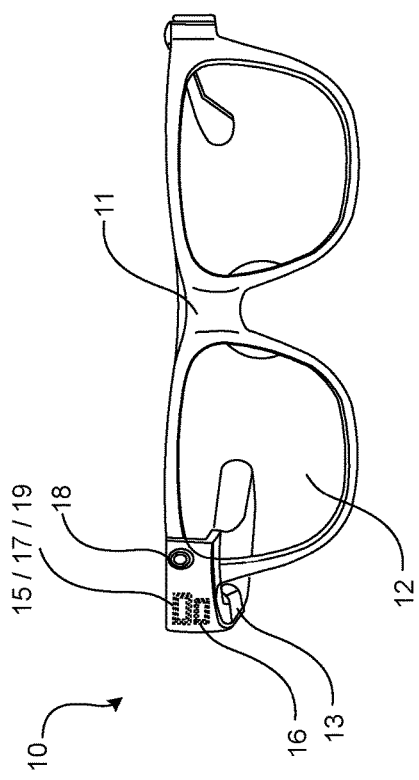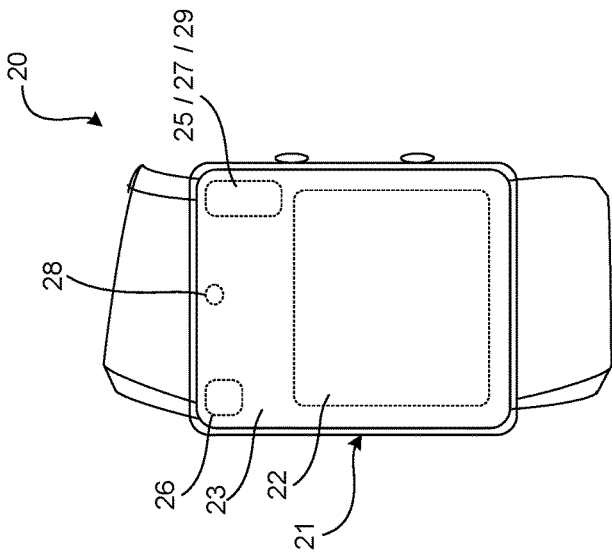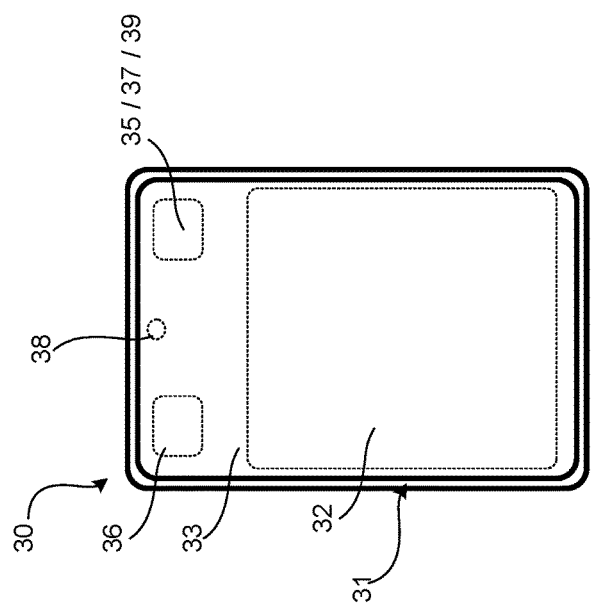

Receive, at a first electronic device, a digital multimedia container file from a second electronic device, where the digital multimedia container file includes visual data of an environment, non-visual data of the environment, a map of the environment, and virtual object anchoring information related to one or more virtual objects anchored to at least one object in the environment
610

Play, by the first electronic device, the digital multimedia container file to view the visual data, the non-visual data, and the one or more virtual objects
620

Edit the digital multimedia container file including anchoring one or more additional virtual objects to a different object in the environment
630

Save the digital multimedia container file on the first electronic device
640

FIG. 6

AUGMENTED REALITY CONTENT EXPERIENCE SHARING USING DIGITAL MULTIMEDIA FILES

CROSS REFERENCE TO RELATED APPLICATION

This application is a continuation application of U.S. application Ser. No. 17/301,596, filed Apr. 8, 2021, and titled "Augmented Reality Content Experience Sharing Using Digital Multimedia Files," which is hereby incorporated by reference in its entirety.

TECHNICAL FIELD

This description relates to augmented reality (AR) content experience sharing using digital multimedia files.

BACKGROUND

Augmented reality (AR) is an interactive experience of a real-world environment where the real world is enhanced by adding computer-generated objects and information, also referred to as virtual objects and information. Augmented reality is used to enhance natural environments or situations and offer perceptually enriched experiences. It is desirable to share these enriched experiences among users.

SUMMARY

According to one general aspect, a computer-implemented method includes capturing visual data of an environment using an image sensor of an electronic device and non-visual data of the environment using one or more non-image sensors of the electronic device. Feature descriptors of one or more objects in the environment are generated using the visual data of the environment and the non-visual data of the environment. A map of the environment is generated using the feature descriptors of the one or more objects. One or more virtual objects are anchored to at least one of the objects using the map. The visual data, the non-visual data, and the map are combined in a digital multimedia container file. The digital multimedia container file is stored on the electronic device or on another electronic device connected to the electronic device.

Implementations may include one or more of the following features. For example, in some implementations the digital multimedia container file may be a moving picture experts group-4 (MPEG-4) format. In some implementations, the digital multimedia container file may be a QuickTime (MOV) format.

In some implementations, the method may further include combining the virtual object anchoring information with the visual data, the non-visual data, and the map in the digital multimedia container file.

In some implementations, the method may further include playing the digital multimedia container file on the electronic device to view the visual data and the one or more virtual objects anchored in the environment.

In some implementations, the method may further include exporting the digital multimedia container file to a different electronic device for playing the digital multimedia container file on the different electronic device.

In some implementations, the method may further include editing the digital multimedia container file including anchoring one or more additional virtual objects to another one of the objects using the map.

In some implementations, generating the map of the environment includes generating a mesh map of facial features of a face, anchoring the one or more virtual objects includes anchoring the one or more virtual objects to the facial features of the face using the mesh map; and combining the visual data, the non-visual data, and the map in the digital multimedia container file includes combining the visual data, the non-visual data, and the mesh map in the digital multimedia container file.

In another general aspect, a computer-implemented method includes receiving, at a first electronic device, a digital multimedia container file from a second electronic device, where the digital multimedia container file includes visual data of an environment, non-visual data of the environment, a map of the environment, and virtual object anchoring information related to one or more virtual objects anchored to at least one object in the environment, playing, by the first electronic device, the digital multimedia container file to view the visual data, the non-visual data, and the one or more virtual objects, editing the digital multimedia container file including anchoring one or more additional virtual objects to a different object in the environment, and saving the digital multimedia container file on the first electronic device.

Implementations may include one or more of the following features. For example, in some implementations, the digital multimedia container file is a moving picture experts group-4 (MPEG-4) format. In some implementations, the digital multimedia container file is QuickTime (MOV) format.

In some implementations, playing, by the first electronic device, the digital multimedia container file includes playing, by the first electronic device, the digital multimedia container file using a live image sensor of the first electronic device.

In some implementations, playing, by the first electronic device, the digital multimedia container file includes playing, by the first electronic device, the digital multimedia container file using a live image sensor of the first electronic device in a different location viewing the different object.

The details of one or more implementations are set forth in the accompanying drawings and the description below. Other features will be apparent from the description and drawings, and from the claims.

BRIEF DESCRIPTION OF THE DRAWINGS

FIGS. 2A-2C are front views of example user electronic devices.

FIG. 6 is a flowchart illustrating example operations of the system of FIG. 3.

DETAILED DESCRIPTION

Figure 1:
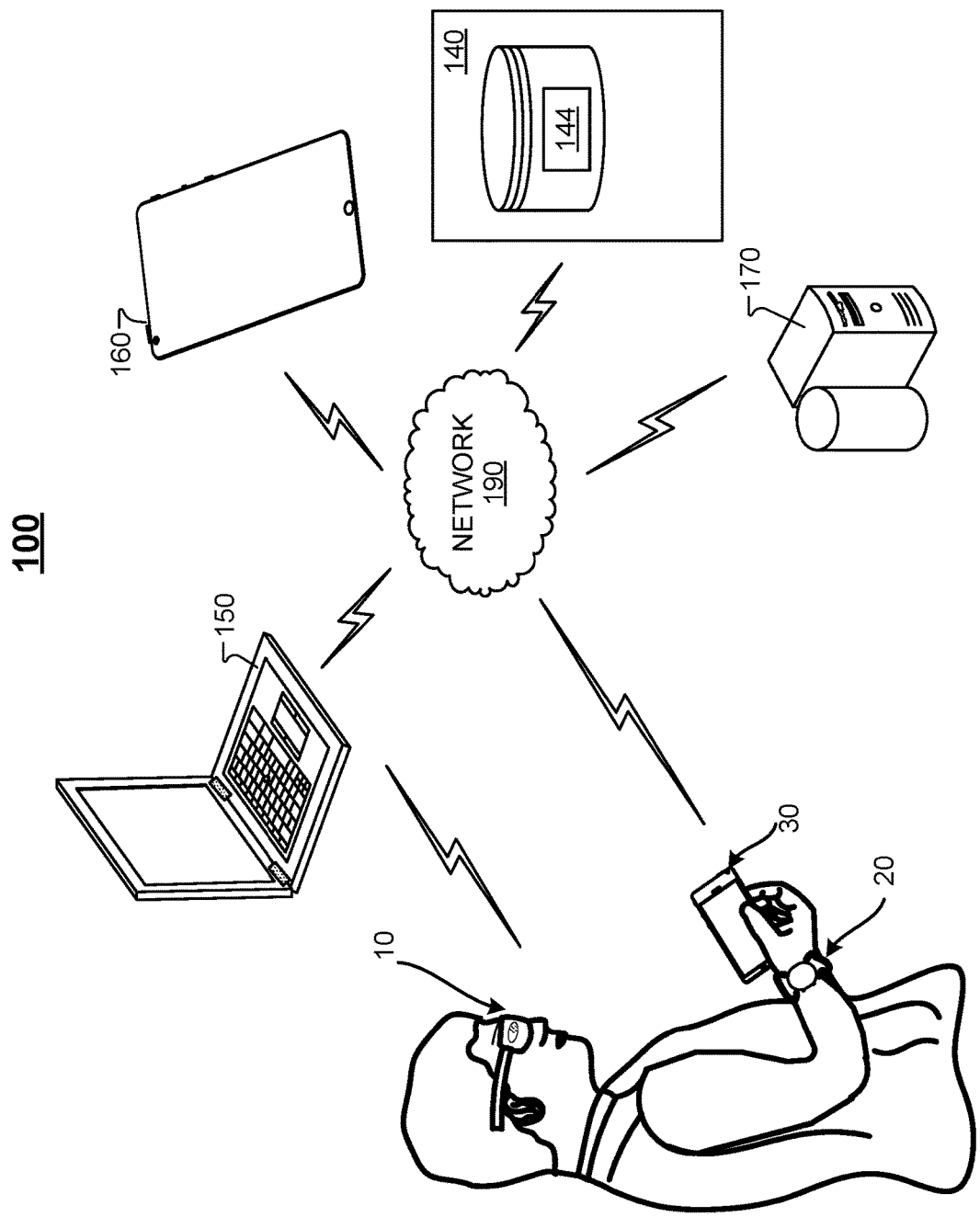
FIG. 1 is a block diagram of a system, in accordance with implementations described herein.

This document describes systems and techniques for sharing an augmented reality (AR) content experience using a digital multimedia container file. Augmented reality lets a user add virtual content to the real world. For example, a user may use an electronic device to capture visual data of a physical environment and to overlay virtual content (e.g., virtual objects and information) on the captured visual data of the physical environment to create an AR content experience. The user may then share the AR content experience with other users, which allows the other users to reproduce the same AR content experience. Technical problems with current solutions that provide for sharing the AR content experience with other users may arise because Internet connectivity may not be available for some or all of the duration of the shared AR content experience and/or the electronic devices viewing the shared experience may have to run at the same time in a close physical proximity to each other when those conditions may not be possible.

This document describes technical solutions that solves the technical problems encountered with current technologies that enable sharing AR content experiences. For example, the technical solution provides a mechanism to save and store the information for the AR content experience in a single, digital multimedia container file, which can be stored on a user's local electronic device and easily shared with and used by other users on their electronic device. The use of a digital multimedia container file enables the user, and others, to edit the AR content, to playback the AR content in a same or different geographic location, and to edit the AR content during the playback. That is, the user can re-experience the live AR session using the stored AR content, and other users can also experience a live AR session using the stored AR content. The digital multimedia container file includes a general file format that is compatible with players, editors, and online video-sharing platforms that enable playback and editing functions. Additionally, the digital multimedia container file offers customizable tracks to save the AR-specific data that is used to reproduce the same live AR session. For instance, as described in more detail below, user A can record an AR video of an object and annotate the AR video with AR annotations. Then, user A can save the AR video on user A's local electronic device in a single, digital multimedia format (e.g., a digital multimedia container format). User A can later replay the AR content from the stored digital multimedia format and can edit the AR content using a live recording session of the same object to edit the AR annotations or a live recording session of a similar object (but not the same exact object) to edit the AR annotations, all using the single, digital multimedia format. One advantage is that no Internet connectivity may be needed to perform these post-recording editing functions and updating. Furthermore, user A can share the digital multimedia format with user B and user B can perform the same functions related to the object or a similar object in a different geographic location using the digital multimedia format. In this manner, user B can experience a live AR experience using the stored AR content, but with user B's own camera viewing the object. Again, the use of the digital multimedia format stored on the local device eliminates the need for Internet connectivity by user B and also enable user B to have a live AR experience reproduction. User B can play back (preview) the video with or without the AR content (i.e., with or without the AR annotations) from the same recorded camera view, as recorded by user A, or from user B's camera view to view from different cameras, which enables a live AR experience for user B.

As used herein, a digital multimedia container file is a type of digital file in a digital file format that holds audio, video, subtitle, and other information including customizable tracks for holding other information such as, for example, AR-specific data. Containers may support a variety of audio and video compression methods and may not be tied to one particular audio or video codec. Examples of a digital multimedia container file include, but are not limited to, MPEG-4 (MP4), QuickTime (MOV), AVI, RealMedia, as well as others. Digital multimedia container file may be used interchangeably throughout this document with digital multimedia container format and digital multimedia container file format and digital multimedia container format file.

FIG. 1 illustrates a user in connection with an example system 100 for recording, storing, and sharing AR content using a digital multimedia container file, in accordance with implementations described herein. The example system 100 may access the stored digital multimedia container file to edit and/or re-create the live AR session using the AR content, which may be performed without the use of network connectivity that otherwise might be needed to access the stored AR content and data for reproducing the live AR session.

In the example shown in FIG. 1, the user is wearing a first wearable device and a second wearable device 20. The first wearable device 10 is a head mounted display (HMD) device 10, in the form of smart glasses 10, simply for purposes of discussion and illustration. However, the principles to be described herein may be applied to other types of HMDs such as, for example, goggles, headsets and the like, having visual data and non-visual data capturing capability, including annotating the captured visual data with AR content. The second wearable device 20 is a wrist worn device 20, in the form of a smartwatch 20, simply for purposes of discussion and illustration. However, the principles to be described herein may be applied to other types of hand/wrist worn devices such as, for example, bracelets, rings and the like. The user is holding a handheld device 30. The handheld device 30 may be, for example, a smartphone 30 having visual data and non-visual data capturing capability, including annotating the captured visual data with AR content, in the form of, for example a camera, simply for purposes of discussion and illustration. However, the principles to be described herein may be applied to other types of electronic devices, such as, for example, a handheld controller, a tablet device, a laptop computing device, and the like, including devices having visual data and non-visual data capturing capability, including annotating the captured visual data with AR content. Furthermore, the first wearable device 10 and the second wearable device may be capable of storing the captured and annotated content on the device itself or on the handheld device 30 in a digital multimedia container file. Similarly, the handheld device 30 is capable of storing the captured and annotated content on the device itself in a digital multimedia container file.

The example system 100 may include one or more computing and/or electronic devices that can exchange data over a network 190. The devices may communicate via the network 190 and/or over alternative network(s) and/directly with each other. Example client devices may include, for example, the example wearable devices 10, 20, the example handheld device 30, other electronic devices such as, for example, a laptop or netbook computing device 150, a tablet computing device 160, a desktop computing device 170, and other such devices. A server 140 may be accessible to the devices via the network 190. The server 140 may provide access to a database 144. In this manner, the wearable devices 10, 20 and the handheld device 30 may also communicate the stored digital multimedia container file over the network 190 to the server 140 and the database 144 for storage at a network-accessible location by those and other devices. The information stored in the database 144 may be used as a backup to the locally-stored AR content information and/or may supplement the locally-stored AR content with AR-related information.

FIG. 2A is a front view of the example first wearable device 10 (the example HMD 10) worn by the user in FIG. 1. FIG. 2B is a front view of the example second wearable device 20 (the example smartwatch 20) shown in FIG. 1. FIG. 2C is a front view of the example handheld device 30 held by the user in FIG. 1.

The first wearable device 10, in the form of an HMD 10, or smart glasses 10 in this example, may include a frame 11, with a display device 12 coupled in the frame 11. In some implementations, an audio output device 13 may be coupled to the frame 11. The HMD 10 may include a sensing system 16 including various sensing system devices and a control system 17 including various control system devices to facilitate operation of the HMD 10. The control system 17 may include a processor 19 operably coupled to the components of the control system 17 and a communication module 15 providing for communication with external devices and/or networks. The HMD 10 may also include an image sensor 18 (i.e., a camera 18). In some implementations, the image sensor 18, or camera 18 may be capable of capturing still and/or moving images, patterns, features, light and the like, and/or may be capable of scanning visual codes as described above. Further, in some implementations, the HMD 10 may include one or more non-image sensors (not shown) and/or the HMD 10 may use non-image sensor information obtained from the second wearable device 20 and/or the handheld device 30.

The first wearable device 10 may be connected to the second wearable device 20 and/or the handheld device 30. For example, the first wearable device 10 may stream information, including files and data, to and from the second wearable device 20 and/or the handheld device 30. For instance, a file stored electronically on the second wearable device 20 and/or the handheld device 30 may be streamed to and played on the first wearable device 10. Similarly, information collected and/or processed by the first wearable device 10 may be stored on the second wearable device 20 and/or the handheld device 30.

The second wearable device 20, in the form of a smartwatch 20 in this example, may include an interface device 21. In some implementations, the interface device 21 may function as an output device, including, for example, a display area 22 that can output information to the user. In some implementations, the interface device 21 may function as an input device, including, for example, a touch surface 23, allowing the interface device 21 to receive touch inputs from the user. In some implementations, the interface device 21 can function as an input device and an output device. The second wearable device 20 may include a sensing system 26 including various sensing system devices. The second wearable device 20 may include a control system 27 including various control system devices, a communication module 25 providing for communication with external devices and/or a network, and a processor 29, to facilitate operation of the device 20. The second wearable device 20 may also include an image sensor 28 (i.e., a camera 28). In some implementations, the image sensor 28, or camera 28 may be capable of capturing still and/or moving images, and/or may be capable of scanning visual codes as described above. Further, in some implementations, the second wearable device 20 may include one or more non-image sensors (not shown) and/or the second wearable device 20 may use non-image sensor information obtained from the HMD 10 and/or the handheld device 30.

The second wearable device 20 may be connected to the first wearable device 10 and/or the handheld device 30. For example, the second wearable device 20 may stream information, including files and data, to and from the first wearable device 10 and/or the handheld device 30. For instance, a file stored electronically on the first wearable device 10 and/or the handheld device 30 may be streamed to and played on the second wearable device 20. Similarly, information collected and/or processed by the second wearable device 20 may be stored on the first wearable device 10 and/or the handheld device 30.

The handheld device 30, in the form of a smartphone 30 in this example, may include an interface device 31. In some implementations, the interface device 31 may function as an output device, including, for example, a display area 32 that can output information to the user. In some implementations, the interface device 31 may function as an input device, including, for example, a touch surface 33, allowing the interface device 31 to receive touch inputs from the user. In some implementations, the interface device 31 can function as an input device and an output device. The handheld device 30 may include a sensing system 36 including various sensing system devices. The handheld device 30 may include a control system 37 including various control system devices, a communication module 35 providing for communication with external devices and/or a network, and a processor 39, to facilitate operation of the handheld device 30. The handheld device 30 may also include an image sensor 38 (i.e., a camera 38). In some implementations, the image sensor 38, or camera 38 may be capable of capturing still and/or moving images. Further, in some implementations, the handheld device 30 may include one or more non-image sensors (not shown) and/or the handheld device 30 may use non-image sensor information obtained from the HMD 10 and/or second wearable device 20. The handheld device 30 may store files and information, which then may be streamed and played on the first wearable device 10 and/or the second wearable device 20.

Figure 3:
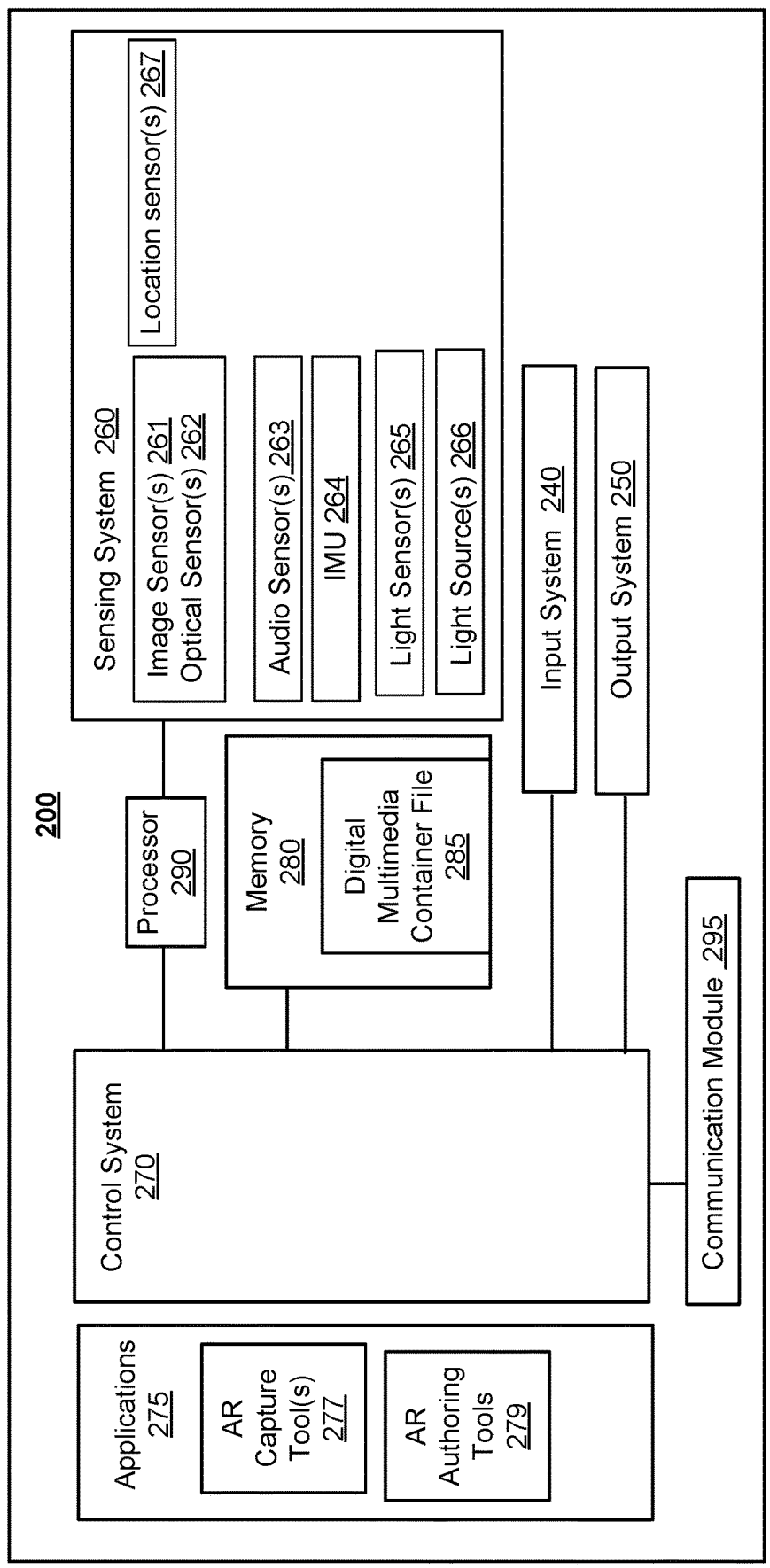
FIG. 3 is a block diagram of a system configured to implement the concepts described herein.

FIG. 3 is a block diagram of an example electronic device 200, such as, for example, one of the example wearable devices 10, 20 shown in FIG. 1, the example handheld device 30 shown in FIG. 1, and/or other electronic devices that may be used to carry out the principles described herein.

The electronic device 200 may include a sensing system 260 and a control system 270. The sensing system 260 may include one or more different types of sensors, imaging sensors and non-imaging sensors. The imaging sensors may include an image sensor 261 (e.g., a camera) and an optical sensor 262. The non-imaging sensors may include, for example, an audio sensor 263, an inertial measurement unit (IMU) sensor 264, a light sensor 265, a light source 266, a location sensor 267, and/or other sensors and/or different combination(s) of sensors. In some implementations, the sensing system 260 may include an image sensor 261 and/or an optical sensor 262, that is capable of scanning, or reading, a visual code.

The control system 270 may include, for example, power/pause control device(s), audio and video control device(s), optical control device(s), and/or other such devices and/or different combination(s) of devices. The sensing system 260 and/or the control system 270 may include more, or fewer, devices, depending on a particular implementation.

The electronic device 200 may include at least one processor 290 in communication with the sensing system 260 and the control system 270. The processor 290 may process inputs received from the sensing system 260, such as, for example, images, captured by the image sensor/optical sensor, including, but not limited to, for example, still images and video. The electronic device 200 may include an input system 240 that can receive user inputs to be processed by the processor 290 and output by an output system 250 under the control of the control system 270. The input system 240 may include various types of input devices including, for example, a touch input surface, audio input devices that can receive audio inputs (including, for example, audio sensors, or microphones, included in the sensing system 260), a gesture recognition device (including, for example, images captured by image sensors(s) of the sensing system 260 and processed by the processor 290), and other such input devices. The output system 250 may include various types of output devices such as, for example, display device(s), audio output device(s), or speakers, physical and/or tactile output devices, and other such output devices. The electronic device 200 may include at least one memory 280, and a communication module 295 providing for communication between the electronic device 200 and one or more other, external device(s), networks, servers and the like.

The electronic device 200 may include one or more applications 275 that include executable code and/or instructions stored on the memory 280 and executed by the processor 290 to perform certain functions and tasks in cooperation with the components of the electronic device 200 such as the sensing system 260 and the control system 270. One application 275 includes an AR capture tool 277 that is configured to use different application programming interfaces (APIs) to create and build an AR experience using the electronic device 200. The AR capture tool 277 enables the electronic device 200 to record and sense its environment record and create an AR video using the sensing system 260, including the image sensors and the non-image sensors. The AR capture tool 277 enables several core capabilities including motion tracking, environmental understanding, and light estimation. The AR capture tool 277 enables motion tracking of the electronic device 200 to understand and track its position relative to the world in its current environment. The AR capture tool 277 enables the electronic device 200 to detect the size and location of all types of surfaces including, for example, horizontal, vertical, and angled surfaces like the ground, a table, walls, as well as other surfaces. The AR capture tool 277 enables the electronic device to perform light estimation to estimate the environment's current lighting conditions.

As the electronic device 200 moves through its environment, the AR capture tool 277 enables the electronic device 200 to track its position as it moves and build its own understanding of the environment in which it is moving, using the sensing system 260. The electronic device's 200 understanding of the real world lets a user place objects, annotations, or other information in a way that integrates seamlessly with the real world. For example, the user can place a napping kitten on the corner of a coffee table, or annotate a painting with biographical information about the artist. Motion tracking means that the user can move around and view these objects from any angle, and even if the user turns around and leaves the room, when the user come backs, the kitten or annotation will be right where the user left it.

More specifically, in some implementations, the AR capture tool 277 uses a process called simultaneous localization and mapping (SLAM) to perform these motion tracking and environmental understanding functions. The AR capture tool 277 uses SLAM and the sensing system 260 to detect visually distinct features in the captured sensing images called feature descriptors and uses these points to compute the electronic device's 200 change in location. The visual information is combined with inertial measurements and other non-imaging sensed information from the IMU 264 to estimate the pose (i.e., position and orientation) of the electronic device 200 relative to the environment over time. AR content may be rendered and aligned with the pose of the electronic device's image sensor 261 to render the AR content from the correct perspective. The rendered virtual image can be overlaid on top of the image obtained from the electronic device's image sensor 262, making it appear as if the virtual content is part of the real world. The AR capture tool 277 uses the feature descriptors to generate a map of the environment (also referred to as a localization map). In some implementations, other processes may be used to perform the motion tracking and environmental understanding functions. For example, in some implementations, the AR capture tool 277 may use a face detection and tracking algorithm to generate a face mesh to which AR annotations (e.g. face makeup) may be added on top of the face mesh.

In terms of environmental understanding, the AR capture tool 277 is constantly improving its understanding of the real world environment by detecting feature points and planes. The AR capture tool 277 looks for clusters of feature points that appear to lie on common horizontal or vertical surfaces, like tables or walls, and makes these surfaces available as planes. The AR capture tool 277 can also determine each plane's boundary and make that information available, which can then be used to place virtual objects resting on flat surfaces. The AR capture tool 277 may continuously and/or periodically update the localization map with additional and/or updated feature points and planes.

The AR capture tool 277 also can create depth maps, images that contain data about the distance between surfaces from a given point, using the image sensor 261. The AR capture tool 277 uses the information provided by a depth map to enable immersive and realistic user experiences, such as making virtual objects accurately collide with observed surfaces, or making them appear in front of or behind real world objects. The AR capture tool 277 can detect information about the lighting of its environment and provide average intensity and color correction of a given image. This information enables the virtual objects to be lighted under the same conditions as the environment around them, increasing the sense of realism. The AR capture tool 277 may use hit testing to take an (x,y) coordinate corresponding to the electronic device's 200 screen (provided by a tap or other interaction) and projects a ray into the image sensor's 261 view of the world, returning any planes or feature points that the ray intersects, along with the pose of that intersection in world space. This allows users to select or otherwise interact with objects in the environment. Oriented points lets the user place virtual objects on angled surfaces. When a hit test returns a feature point, the AR capture tool 277 looks at nearby feature points and uses those to attempt to estimate the angle of the surface at the given feature point. The AR capture tool 277 will then return a pose that takes that angle into account.

Poses can change as the AR capture tool 277 improves its understanding of the electronic device's own position and environment. When the user wants to place a virtual object, an anchor may be defined to ensure that AR capture tool 277 tracks the object's position over time. In some implementations, an anchor may be created based on the pose returned by a hit test, as described above.

The fact that poses can change means that the AR capture tool 277 may update the position of environmental objects like planes and feature points over time. Planes and points may be referred to as a type of object called a trackable. Like the name suggests, these are objects that AR capture tool 277 tracks over time. AR content (e.g., virtual objects) may anchored to specific trackables to ensure that the relationship between the AR content and the trackable remains stable even as the electronic device 200 moves around. For example, if the user places a virtual object on a real object (e.g., a desk), if the AR capture tool 277 later adjusts the pose of the plane associated with the desk, the virtual object will still appear to stay on top of the table. Anchors ensure that objects appear to stay at the same position and orientation in space to maintain the illusion of virtual objects placed in the real world.

Anchors may use world space, which is the coordinate space in which the image sensor 261 (e.g., camera) and objects are positioned. The image sensor 261 and object positions are updated in world space from frame to frame. Pose represents an object's position and orientation in world space. When an anchor is created, a pose that describes a position and orientation relative to the world space estimate for the current frame is used. One or more objects may be attached to an anchor. The anchor and the objects attached to it appear to stay where they are placed in the world. As the anchor pose adapts to world space updates in each frame, the anchor updates the objects' poses accordingly. Multiple objects can be attached to the same anchor to ensure that these objects maintain their relative position and orientation, even when the anchor's pose adjusts. Anchors may be used in an AR scene. Anchors may be created in the context of a trackable (such as a plane) or a position in world space.

The information captured by the AR capture tool 277 is formatted and stored locally on the electronic device 200 in a digital multimedia container file 285 in the memory 280. The digital multimedia container file 285 is a general file format that enables the applications 275 to playback and edit the information. Also, the digital multimedia container file 285 includes customizable tracks to save the information related to reproducing a same live AR video, including localization map and anchor information. In some implementations, the digital multimedia container file 285 includes a moving picture experts group-4 (MPEG-4) format. In some implementations, the digital multimedia container file 285 includes QuickTime (MOV) format. In some implementations, other digital multimedia container files may be used.

The digital multimedia container file 285 may be communicated from the electronic device 200 to another electronic device using the communication module 295, where the digital multimedia container file 285 is then stored locally on the other electronic device for use by that electronic device. For instance, in some implementations, the digital multimedia container file 285 may be stored locally on the handheld device 30 for use by the first wearable device 10 and/or the second wearable device 20.

Figure 4:
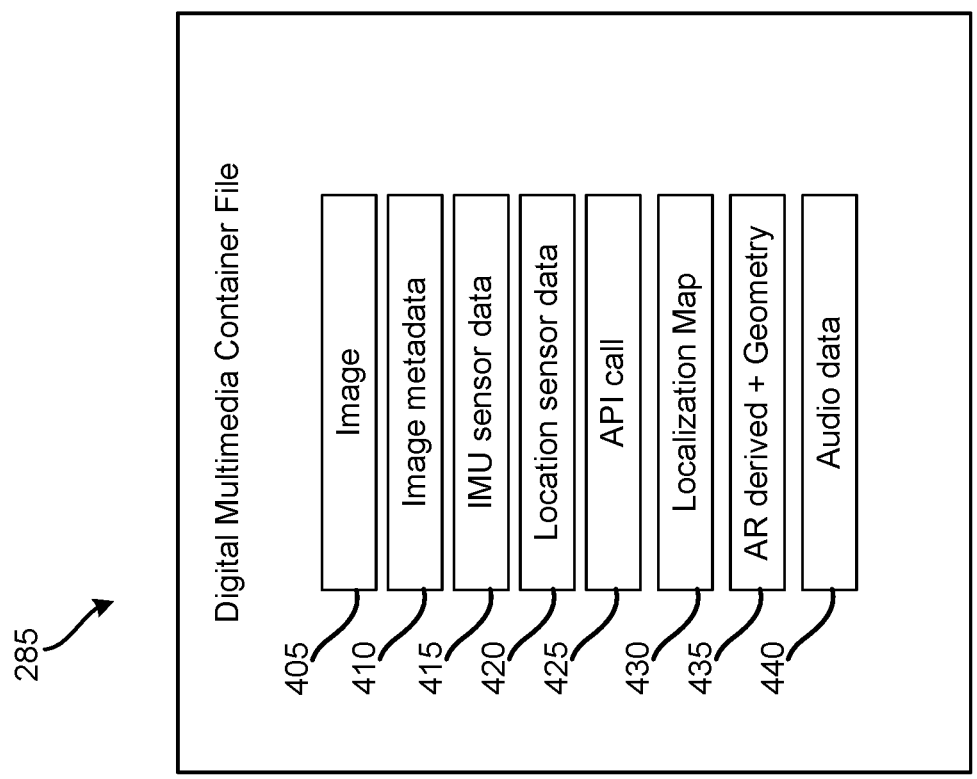
FIG. 4 is a block diagram of the digital multimedia container file of FIG. 3.

Referring also to FIG. 4, the digital multimedia container file 285 may include the following information that is captured by the sensing system 260 and/or generated by the AR capture tool 277. For example, the digital multimedia container file 285 may include, but is not limited to, image information 405, image metadata 410, IMU sensor data 415, location sensor data 420, API call information 425, localization map 430, AR derived geometry 435, and audio data 440. This information and metadata 405 to 440 is stored locally so that it may be used for playback and editing of an AR video. In some implementations, the applications 275 include an AR authoring tool 279, which enables the user to playback and edit the digital multimedia container file 285.

Figure 5:
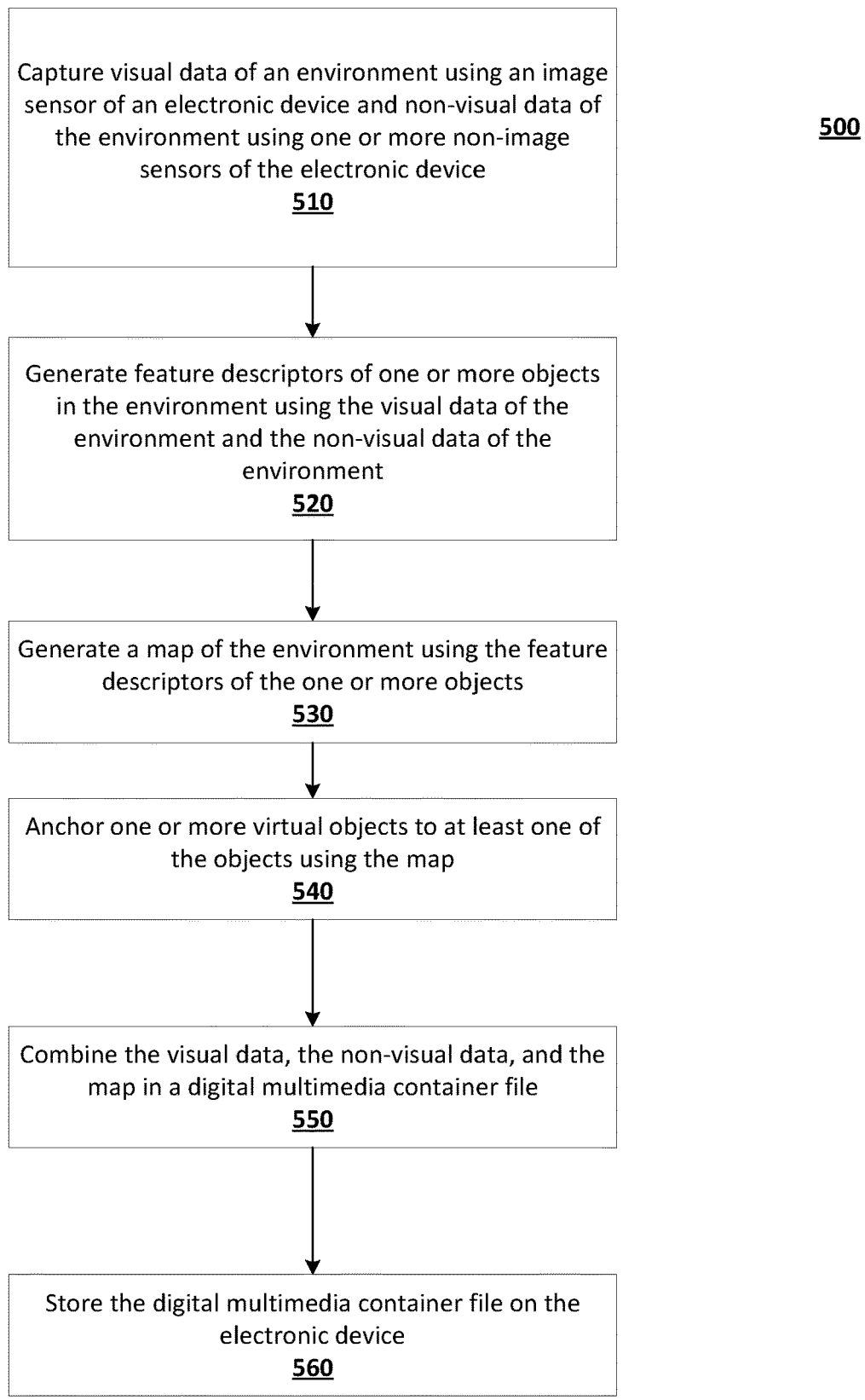
FIG. 5 is a flowchart illustrating example operations of the system of FIG. 3.

Referring to FIG. 5, an example process 500 illustrates example operations of the electronic device 200 of FIG. 3 and the system 100 of FIG. 1. More specifically, process 500 illustrates an example of a computer-implemented method to capture, create, and store an annotated AR environment in a digital multimedia container file. Instructions for the performance of the process 500 may be stored in the memory 280 and executed by the processor 290 on the electronic device 200. The instructions for performance of process 500 may cause the processor 290 to implement one or more of the applications 275 and its components.

Process 500 includes capturing visual data of an environment using an image sensor of an electronic device and non-visual data of the environment using one or more non-image sensors of the electronic device (510). For example, the electronic device 200 captures visual data of an environment using the image sensor 261 and non-visual data of the environment using one or more non-image sensors 263, 264, 265, 266, and 267. In use, a user may use the camera (image sensor 261) of the electronic device 200 to capture the visual data of the environment and use the non-image sensors to capture the non-visual data of the environment.

Process 500 includes generating feature descriptors of one or more objects in the environment using the visual data of the environment and the non-visual data of the environment (510). For example, the applications 275, including the AR capture tool 277, generate feature descriptors of one or more objects in the environment using the visual data and the non-visual data. Process 500 includes generating a map of the environment using the feature descriptors of the one or more objects (530). For example, the applications 275, including the AR capture tool 277, generate a map of the environment using the feature descriptors of the one or more objects.

Process 500 includes anchoring one or more virtual objects to at least one of the objects using the map (540). For example, the applications 275, including the AR capture tool 277, anchors one or more virtual objects to at least one of the objects using the map. As discussed above, when an anchor is created, a pose that describes a position and orientation relative to the world space estimate for the current frame is used. One or more objects may be attached to an anchor. The anchor and the objects attached to it appear to stay where they are placed in the world. As the anchor pose adapts to world space updates in each frame, the anchor updates the objects' poses accordingly. Multiple objects can be attached to the same anchor to ensure that these objects maintain their relative position and orientation, even when the anchor's pose adjusts.

Process 500 includes combining the visual data, the non-visual data, and the map in a digital multimedia container file (550) and storing the digital multimedia container file on the electronic device (560). For example, the applications 275, including the AR capture tool 277, combine the visual data, the non-visual data, and the map in a digital multimedia container file 285 and storing the digital multimedia container file 285 in memory 280 on the electronic device 200. The information in the digital multimedia container file 285 includes the information and data illustrated in FIG. 4. In some implementations, the digital multimedia container file is an MPEG-4 format. In some implementations, the digital multimedia container file 285 is a MOV format.

Optionally, the digital multimedia container file may be stored on another electronic device for use by the electronic device. For example, in some implementations, the first wearable device 10 and/or the second wearable device 20 may store the digital multimedia container file on the handheld device 30 for use (e.g., streaming and playing) by the first wearable device 10. That is, in some implementations, the first wearable device 10 and/or the second wearable device 20 may perform the one or more of the functions of process 500 in cooperation with the handheld device 30, which may perform one or more of the function of process 500 including storing the digital multimedia container file on the handheld device 30.

Optionally, the process 500 may include combining the visual object anchoring information with the visual data, the non-visual data, and the map in the digital multimedia container file 285. The electronic device 200 may play the digital multimedia container file on the electronic device 200 to view the visual data and the one or more virtual objects anchored in the environment. The electronic device 200 may export the digital multimedia container file 285 to an other electronic device for playing the digital multimedia container file 285 on the other electronic device. Additionally, the electronic device 200 and/or the other electronic device may edit the digital multimedia container file using the AR authoring tool 279 including anchoring one or more additional virtual objects to another one of the objects using the map.

In another user case, the map generated as part of process 500 may include generating a mesh map of facial features of a face. In this manner, one or more virtual objects may be anchored to the facial features of the face using the mesh map. The visual data of the face, the non-visual data, and the mesh map may be combined in the digital multimedia container file and stored in memory 280 of the electronic device 200.

Referring to FIG. 6, an example process 600 illustrates example operations of the electronic device 200 of FIG. 3 and the system 100 of FIG. 1. More specifically, process 600 illustrates an example of a computer-implemented method to receive a digital multimedia container file, play, edit, and save the format on an electronic device. Instructions for the performance of the process 600 may be stored in the memory 280 and executed by the processor 290 on the electronic device 200. The instructions for performance of process 600 may cause the processor 290 to implement one or more of the applications 275 and its components.

Process 600 includes receiving, at a first electronic device, a digital multimedia container file from a second electronic device, where the digital multimedia container file includes visual data of an environment, non-visual data of the environment, a map of the environment, and virtual object anchoring information related to one or more virtual objects anchored to at least one object in the environment (610). For example, the electronic device 200 may receive a digital multimedia container file 285 from a second electronic device, where the digital multimedia container file 285 includes visual data of an environment, non-visual data of the environment, a map of the environment, and virtual object anchoring information related to one or more virtual objects anchored to at least one object in the environment.

Process 600 may include playing, by the first electronic device, the digital multimedia container file to view the visual data, the non-visual data, and the one or more virtual objects (620). For example, the electronic device 200 may play the digital multimedia container file to view the visual data, the non-visual data, and the one or more virtual objects.

Process 600 includes editing the digital multimedia container file including anchoring one or more additional virtual objects to a different object in the environment (630) and saving the digital multimedia container file on the first electronic device (640). For example, the electronic device 200 may use the applications 275, including the AR authoring tools 279, to edit the digital multimedia container file 285 including anchoring one or more additional virtual objects to a different object in the environment and save the digital multimedia container file 285 in memory 280 on the electronic device 200. The computer-implemented method of claim 9, wherein the digital multimedia container file is a moving picture experts group-4 (MPEG-4) format.

Process 600 may optionally include playing, by the first electronic device, the digital multimedia container file using a live image sensor of the first electronic device. Further, process 600 may include playing, by the first electronic device, the digital multimedia container file using a live image sensor of the first electronic device in a different location viewing the different object.

Figure 7:
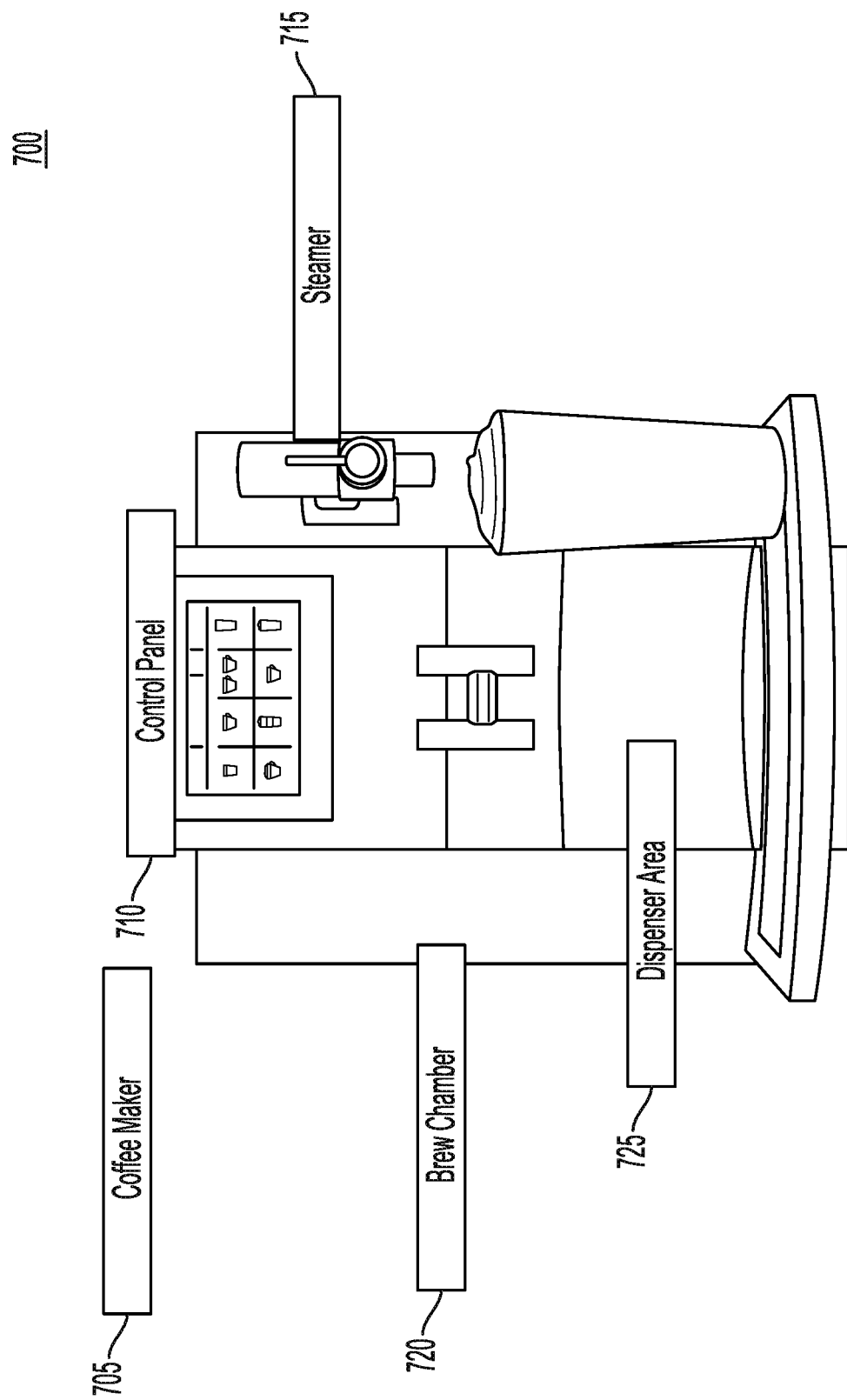
FIG. 7 is an example scene of an AR virtual environment.

Referring to FIG. 7, an example AR scene 700 is illustrated in accordance with the principles described herein. The AR scene 700 may be live recorded and created using the system 100, the electronic device 200, and with the processes 500 and 600. In one example use case, user A want to record an AR video to show customer B how to use the new model coffee machine. The user A uses electronic device 200 and turns on the image sensor 261 (i.e., the camera) and records the coffee maker along with the AR capture tool 277 and the AR authoring tool 279. The user A adds AR objects 705, 710, 715, 720, and 725, which in this example are AR annotations. The electronic device 200 generates the map using the feature descriptors of the coffee maker object and anchors the AR objects 705-725 at the locations around the coffee maker as selected by user A. The electronic device 200 saves the visual data, the non-visual data, and the map to a digital multimedia container file 285, such as an MP4 format file, in the memory 280 of the electronic device 200. The virtual objects information also may be saved as part of the digital multimedia container file. If desired, user A can add additional AR objects to the digital multimedia container file using a post-editing tool like the AR authoring tool 279 and re-save the file.

User A can communicate the digital multimedia format file 285 to user B, for example, by posting it to a network site for user B to download to their own electronic device. In some implementations, user B can preview the video with or without the AR annotations. User B, in a different geographic location with a different coffee machine that is the same model as the one user A used to create the video, can play the digital multimedia container file on their electronic device 200 and turn on an AR mode of user B's camera. This enables user B to study their own coffee machine and see the same AR annotations 705-725 on his/her own from different viewing angles all without needing Internet connectivity because the information needed is contained in the digital multimedia container file that has been received on user B's electronic device. User B could also use an authoring tool to add their own AR objects to the file.

Similarly, in other use cases, the systems and techniques described above can be used for augmented face painting on user A, which can be saved in a digital multimedia container file and shared with friends who can try the same virtual face painting on their own faces. As discussed above, the AR capture tool 277 and AR authoring tool 279 may use a face detection and tracking algorithm to generate a face mesh to which AR content (e.g., AR face makeup) may be applied. The face mesh and related sensor data may be saved to a digital multimedia container file, which then may be shared with other users so that the other users may experience the AR face makeup on their own face. The same use may also be applied to not only the face, but also the human body where a body detection and tracking algorithm may be used to generate a body mesh and/or body map such that AR content (e.g., AR clothes) may be applied. The body mesh and/or body map and related sensor data may be saved to a digital multimedia container file, which then may be shared with other users so that the other users may experience the AR clothes on their own bodies. Also, user A can record a customized note about where and how to move and place the home decorations and send the AR video to user B to play. Also, user A can create an AR guidance of a scenic place and share it using the digital multimedia container file with others to allow the others to follow the AR annotations using their own electronic devices when physically visiting the same scenic place.

Figure 8:
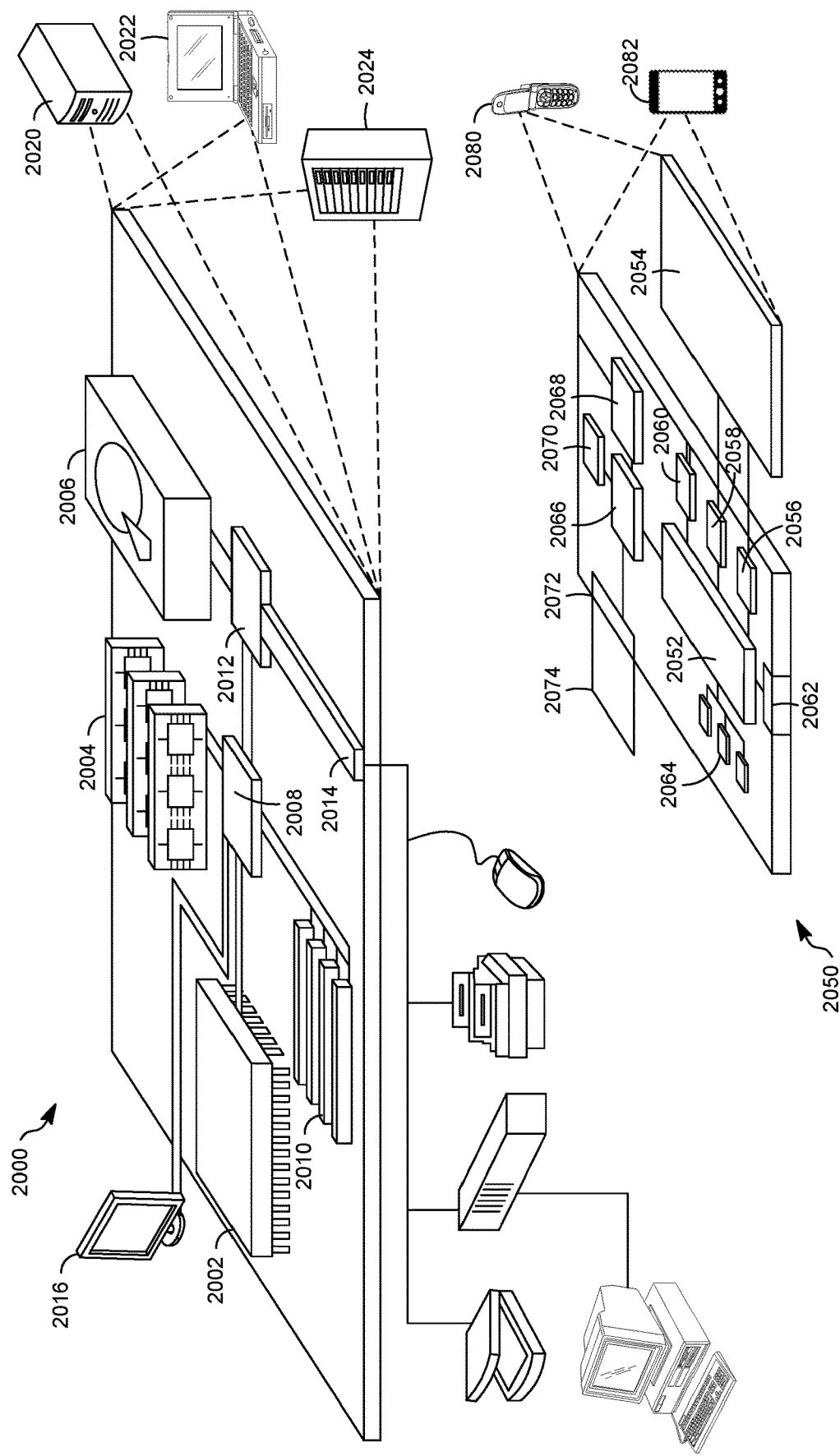
FIG. 8 shows an example of a generic computer device and a generic mobile computer device.

FIG. 8 shows an example of a generic computer device 2000 and a generic mobile computer device 2050, which may be used with the techniques described herein. Computing device 2000 is intended to represent various forms of digital computers, such as laptops, desktops, tablets, workstations, personal digital assistants, televisions, servers, blade servers, mainframes, and other appropriate computing devices. For example, computing device 2000 may be and/or be used as the server 140 of FIG. 1. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. The processor 2002 can be a semiconductor-based processor. The memory 2004 can be a semiconductor-based memory. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high-speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provided in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provided as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, WiFi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smartphone 2082, personal digital assistant, or other similar mobile device.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method, comprising:
recording an augmented reality session of an environment using an image sensor of an electronic device, wherein the augmented reality session includes one or more virtual objects inserted in the environment and the environment is located in a first geographic location;
storing the augmented reality session in a digital multimedia container file on the electronic device; and
playing back the augmented reality session of the environment on the electronic device from the digital multimedia container file in a second geographic location without using the image sensor, wherein the second geographic location is a different location than the first geographic location.

2. The computer-implemented method of claim 1, wherein the digital multimedia container file is a moving picture experts group-4 (MPEG-4) format.

3. The computer-implemented method of claim 1, wherein the digital multimedia container file is QuickTime (MOV) format.

4. The computer-implemented method of claim 1, wherein:
recording the augmented reality session includes capturing visual data of the environment using the image sensor of the electronic device and non-visual data of the environment using one or more non-image sensors of the electronic device; and
storing the augmented reality session includes storing the visual data of the environment and the non-visual data of the environment using one or more customizable tracks in the digital multimedia container file.

5. The computer-implemented method of claim 1, wherein the electronic device is a first electronic device, the computer-implemented method further comprising:
transferring the digital multimedia container file to a second electronic device; and
playing back the augmented reality session of the environment on the second electronic device from the digital multimedia container file in a third geographic location, wherein the third geographic location is a different location than the first geographic location.

6. A computer program product, the computer program product being tangibly embodied on a non-transitory computer-readable medium and including executable code that, when executed by an electronic device, is configured to cause the electronic device to:
record an augmented reality session of an environment using an image sensor of the electronic device, wherein the augmented reality session includes one or more virtual objects inserted in the environment and the environment is located in a first geographic location;
store the augmented reality session in a digital multimedia container file on the electronic device; and
play back the augmented reality session of the environment on the electronic device from the digital multimedia container file in a second geographic location without using the image sensor, wherein the second geographic location is a different location than the first geographic location.

7. The computer program product of claim 6, wherein the digital multimedia container file is a moving picture experts group-4 (MPEG-4) format.

8. The computer program product of claim 6, wherein the digital multimedia container file is QuickTime (MOV) format.

9. The computer program product of claim 6, wherein:
recording the augmented reality session includes capturing visual data of the environment using the image sensor of the electronic device and non-visual data of the environment using one or more non-image sensors of the electronic device; and
storing the augmented reality session includes storing the visual data of the environment and the non-visual data of the environment using one or more customizable tracks in the digital multimedia container file.

10. The computer program product of claim 6, wherein the electronic device is a first electronic device, and further comprising executable code that, when executed by the electronic device, is configured to cause the electronic device to:
transfer the digital multimedia container file to a second electronic device; and
play back the augmented reality session of the environment on the second electronic device from the digital multimedia container file in a third geographic location, wherein the third geographic location is a different location than the first geographic location.

11. A device, comprising:
an image sensor;
one or more non-image sensors;
a memory having instructions; and
a processor configured by the instructions to:
record an augmented reality session of an environment including visual data using the image sensor and non-visual data using the one or more non-image sensors, wherein the augmented reality session includes one or more virtual objects inserted in the environment and the environment is located in a first geographic location;
store the augmented reality session in a digital multimedia container file in the memory; and
play back the augmented reality session of the environment from the digital multimedia container file in a second geographic location without using the image sensor, wherein the second geographic location is a different location than the first geographic location.

12. The device of claim 11, wherein the digital multimedia container file is a moving picture experts group-4 (MPEG-4) format.

13. The device of claim 11, wherein the digital multimedia container file is QuickTime (MOV) format.

14. The device of claim 11, wherein the processor is configured by the instructions to store the visual data of the environment and the non-visual data of the environment using one or more customizable tracks in the digital multimedia container file.

\* \* \* \* \*